Dec. 20, 1966     H. M. STRONG     3,292,997
APPARATUS AND METHOD OF CONTROLLING PRESSURE
Filed Nov. 12, 1964     3 Sheets-Sheet 1
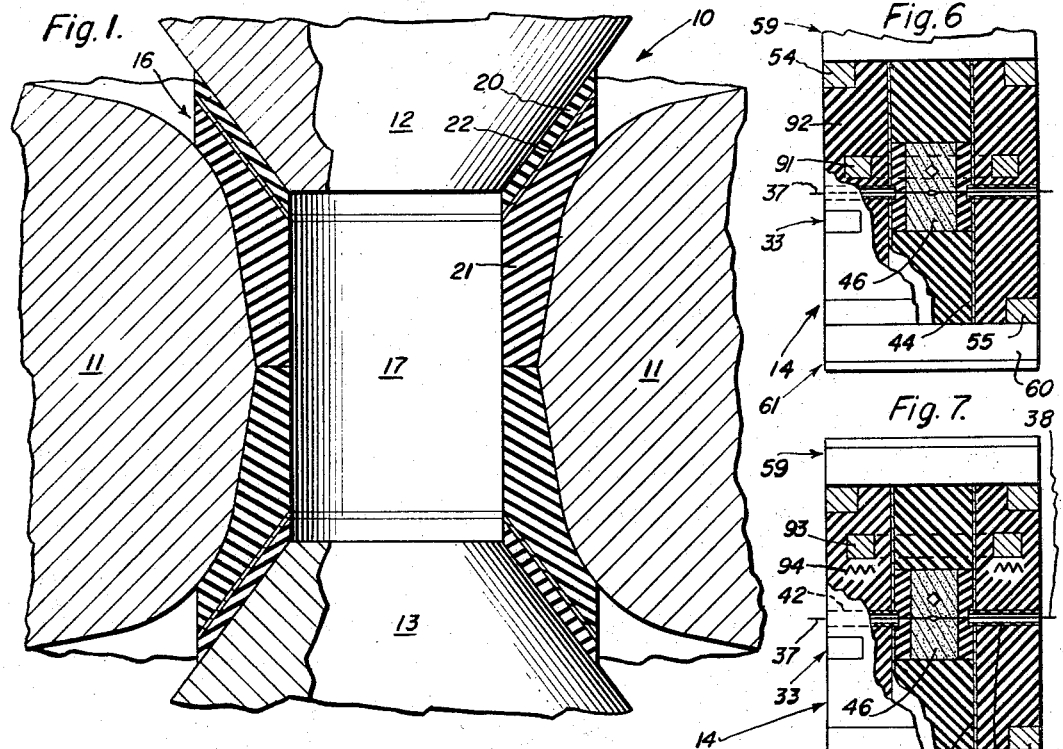
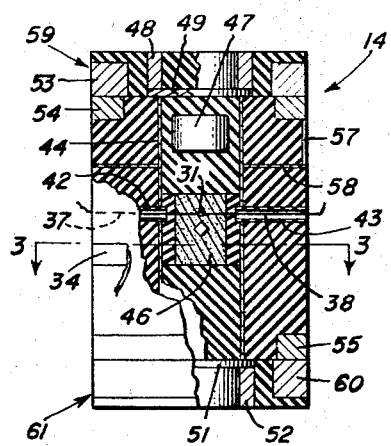
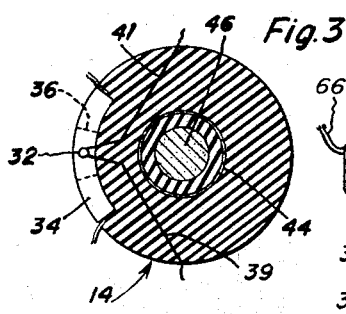
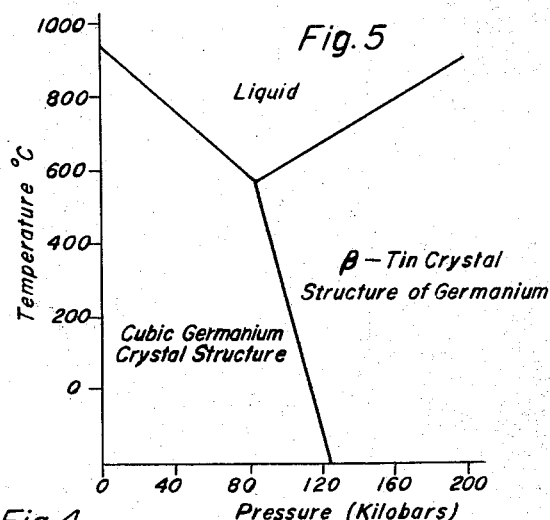
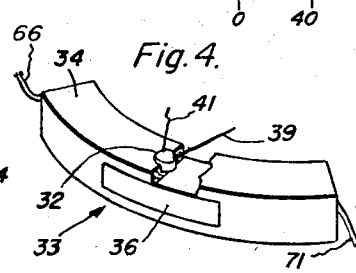
Inventor:
Herbert M. Strong,
by
His Attorney.

Inventor:
Herbert M. Strong,
by
His Attorney.

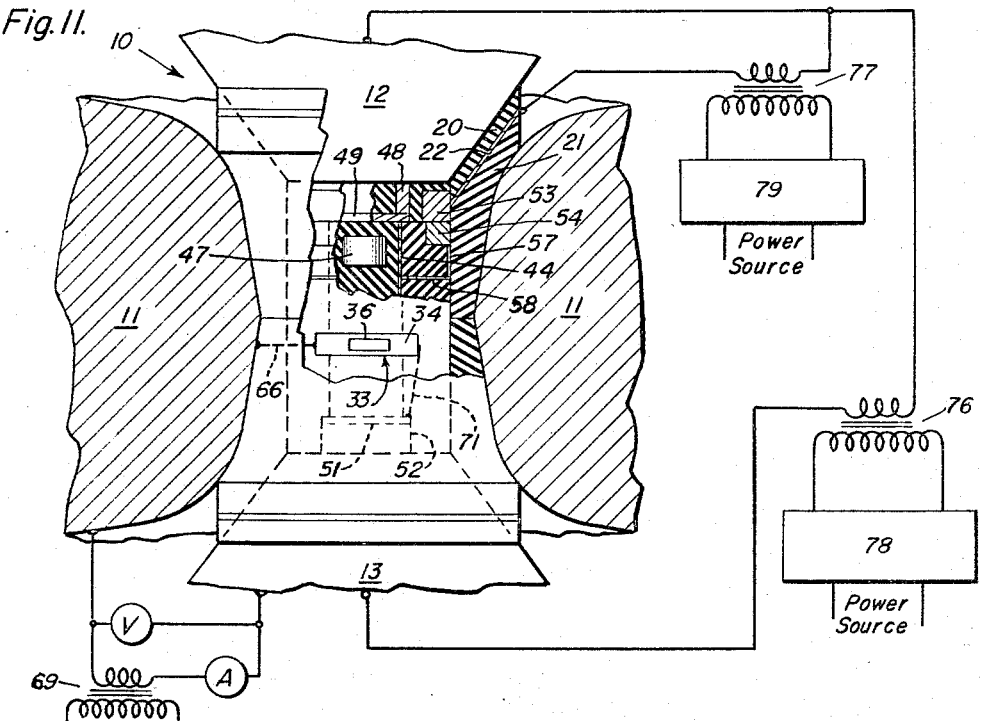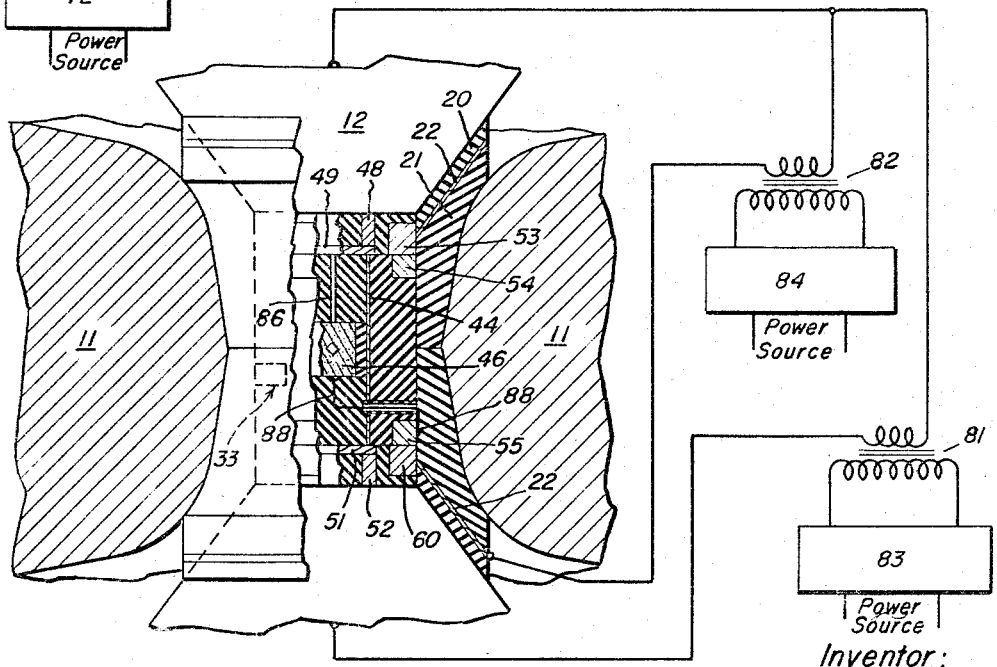

United States Patent Office 3,292,997
Patented Dec. 20, 1966

3,292,997
APPARATUS AND METHOD OF CONTROLLING PRESSURE
Herbert M. Strong, Schenectady, N.Y., assignor to General Electric Company, a corporation of New York
Filed Nov. 12, 1964, Ser. No. 410,636
8 Claims. (Cl. 23—209.2)

This invention relates to reaction vessel configurations and appurtenances therefor for use in superpressure apparatus wherein such vessels are disposed in a reaction volume and exposed to extremely high pressures and temperatures over extended periods of time and more particularly to means for monitoring the pressure conditions in such a reaction vessel and also to means and methods for compensating for undesirable pressure variations occurring within the reaction vessel during the period in which the reaction progresses.

A reaction vessel may, in general, be described as a containing vessel or enclosure within which is positioned a specimen material to be subjected to high pressure, high temperature conditions for the production or manufacture of a new article or form of matter or for research invesitgations into the behavior of materials under the aforementioned conditions. Generally, such a vessel will form part of a pressure absorbing structure including, in addition to the reaction vessel, some conforming configuration of pressure transmitting and thermally insulating material. This pressure absorbing structure is disposed within a reaction volume and submitted to the applicalion of pressure by the inward movement thereagainst of at least one of the confining members defining the reaction volume. Various reaction vessel configurations are described in U.S. 2,941,-251–Strong, U.S. 2,944,289–Hall, U.S. 3,030,662–Strong, and U.S. 3,088,170–Strong. U.S. 2,941,248–Hall and U.S. 3,147,433–Clausen adequately described apparatus suitable for the application of high pressures and high temperature to such reaction vessels in order to affect the desired changes in the specimen material. As indicated in U.S. 2,941,248 (column 4, lines 31–61) the tremendous pressures generated in the apparatus described are generated in a reaction volume, which in turn contains a reaction vessel, through which the pressures are applied to the specimen material.

Much study and effort has been expended in the attempt to product improved apparatus and techniques for determining the absolute pressures and temperatures to which the interior of the reaction vessel is actually subjected. Although progress has been made there is considerable room for improvement, since accurate knowledge of the prevailing environmental conditions during the conduct of high pressure, high temperature operations within the reaction vessel is vital to a thorough understanding of the particular mechanism involved. For example, in order to fully explain the remarkable transition of non-diamond carbon to the diamond form a much more reliable method and/or means for assessing the intra reaction chamber conditions of pressure and temperature has long been sought. It is believed that a more thorough understanding of the mechanism of diamond formation will enable yields of greatly improved quality and size and will enable the ready production of various diamond crystalline forms through accurate control of the parameters involved.

In addition, because the various reactions and transformations which occur in materials at high pressure and temperature are usually of the type which result in a reduction of the volume of the specimen material, and consequently of the pressure within the reaction vessel, some reliable controllable method or means for compensating for pressure decay by this and other mechanisms has likewise been sought. The growth of diamond is known to be very sensitive to the pressure-temperature-time relationship and for this reason the apparatus and method described herein are related to the diamond growth process, however, this invention is equally applicable to other high temperature, high pressure reactions in which it is desirable to compensate for pressure decay.

It is, therefore, a primary object of this invention to provide in and appurtenant to a reaction vessel a pressure monitoring element having a unique configuration whereby the detection of the parameter being measured with the monitoring element is very accurately accomplished.

It is likewise an object of this invention to provide a method and means for controllably compensating for the pressure decay occurring within a reaction vessel.

It is a further object of this invention to provide an optimum reaction vessel construction for use in a high pressure, high temperature apparatus employing in combination the aforementioned improved pressure monitoring element and novel method and means for controllably compensating for pressure decay during high pressure, high temperature reactions.

These and other objects are provided in a reaction vessel by embodying therein a small body, or piece, of germanium partially contained in or completely covered by graphite. The graphite mass containing this small body of germanium serves as a resistance heater for the germanium and a thermocouple located adjacent the germanium sense the temperature of the graphite-germanium combination. This pressure monitoring unit comprising the contained germanium, heater and thermocouple, should be located in the center two-thirds of the height of the reaction vessel configuration and adjacent the exterior perimeter thereof. In addition, for example, at a suitable location within the high pressure reaction vessel a quantity of a substance is located, which substance exhibits a change of state phase transformation accompanied by a volume increase of at least about 5 percent under conditions approximating the working pressure and temperature within the reaction vessel. Unless auxiliary heating means are provided therefor, the location of the substance to provide the increase in volume should be at a point where the temperature gradient normally occurring within the cell under operating conditions provides a temperature for the substance close to its change of state phase transformation temperature under the prevailing pressure conditions. The term "change of state" is intended to describe transformations between solid and liquid in either direction depending upon which direction produces the increase in volume. Thus, when additional internal pressure of a compensatory nature is required within the reaction cell, the temperature of the aforementioned substance need only be raised or lowered, as by a small auxiliary independent heater or by changing the temperature of the main heater, to cause the desired volume increasing phase transformation to occur.

Successful employment of the pressure compensating increase in volume of the selected substance depends upon having an accurate indication of the pressure fluctuations within the reaction vessel. Given this information the proper time can be chosen for effecting the increase in volume thereby providing a compensating pressure increase, which is highly beneficial to the successful completion of the particular high pressure, high temperature operation.

Although the invention disclosed herein will have much utility in connection with diamond growth experiments, it is to be understood that the invention is broadly applicable to those high pressure, high temperature operations in which it is desired either to closely monitor the pressure within the reaction vessel or both to monitor the pressure and to enable the operator to compensate for undesirable decreases in pressure within the reaction vessel at the proper time and to the proper degree.

The accompanying drawings which are part of the following detailed description of this invention and form a part of this specification include:

FIG. 1, wherein is presented a fragmentary, vertical sectional view of a high pressure apparatus showing a portion of a pressure absorbing structure, which can be completed by the insertion therein of a reaction vessel incorporating pressure monitoring means and pressure compensating means in accordance with this invention;

FIG. 2 is a vertical sectional view of a reaction vessel configuration embodying a preferred arrangement of this invention;

FIG. 3 is a three dimensional view showing the pressure monitoring element in greater detail with a portion thereof broken away;

FIG. 4 is an elevtional view of the pressure monitoring element shown in FIGS. 2 and 3;

FIG. 5 shows the fusion curve for germanium, which curve serves as the pressure reference enabling practice of this invention;

FIG. 6 is a vertical sectional view of a reaction vessel embodying a second arrangement of this invention;

FIG. 7 is a vertical sectional view of reaction vessel embodying a third arrangement of this invention;

Figure 8:
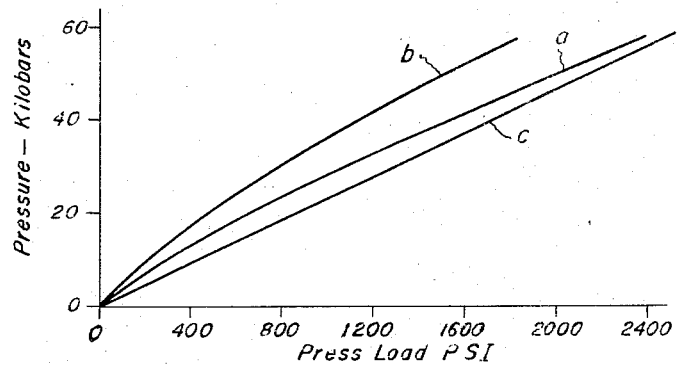
Figure 9:
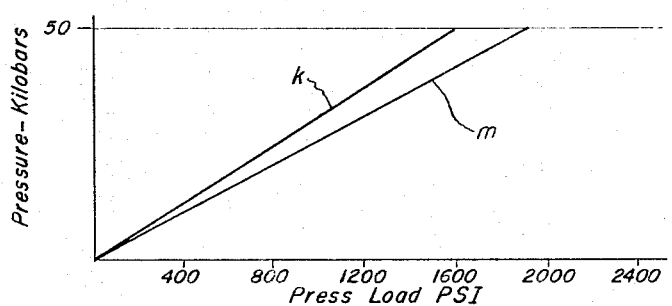
Figure 10:
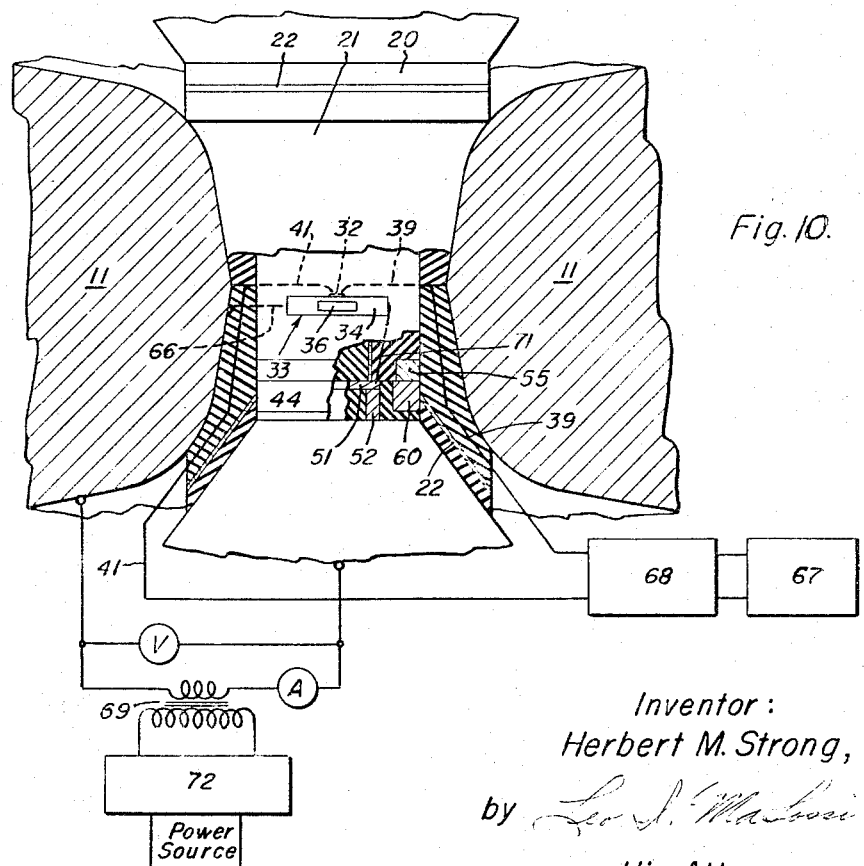

FIG. 8 includes a graph resulting from calibration of a simple holder, or reaction vessel, such as is shown in FIG. 2;

FIG. 9 is a graphic representation of the relative effects of press load on the pressure in a reaction vessel when the reaction vessel is hot as compared to operation when no heat has been applied thereto;

FIG. 10 is a schematic representation of circuitry and equipment for detecting the temperature of the pressure monitoring element and for controllably heating the pressure monitoring element;

FIG. 11 shows a schematic representation of one arrangement of circuitry and equipment for controllably heating the reaction cell, the material located in the reaction cell to effect phase transformation and the pressure monitoring element; and FIG. 12 is a schematic representation of an alternate arrangement for controllably heating the reaction cell and the material to effect a phase transformation.

The apparatus 10 is a preferred form of an apparatus for obtaining high pressure, high temperature conditions is illustrated in FIG. 1. In apparatus 10 an operational high pressure reaction volume is provided within and defined by an annular ring or belt 11 and a pair of opposed tapered punches 12 and 13. Although it is not illustrated, it will be understood that belt 11 is suitably reinforced by one or more binding and strengthening rings and both belt 11 and such strengthening rings are made of very high strength materials. For example, the belt 11 may be made of cemented tungsten carbide while the rings may be made of high grade tool steel. Punches 12 and 13 are also of high strength material, such as either cemented tungsten carbide or tool steel and are preferably provided with metal binding or reinforcing rings (not shown) as in the case of belt 11. The reaction volume contained or defined by these elements receives a pressure absorbing structure comprising the reaction vessel 14 and a gasket assembly 16. As shown, the internal configuration of the pressure absorbing structure defines the volume 17 within which reaction vessel 14 is closely fitted and also serves to seal reaction vessel 14 within the volume generally defined by punches 12 and 13 and belt 11.

Gasket assembly 16 comprises upper and lower subassemblies and since these subassemblies are alike, only the upper gasket assembly will be described. The upper assembly comprises three elements; namely, the thermally electrically insulating gaskets 20 and 21 and electrically conducting gasket 22 disposed therebetween insulated from both belt 11 and punch 12. Each of these gaskets is an annular body, being of generally frusto-conical shape and these gasket elements cooperate to fit tightly together and fill the space between opposing surfaces of belt 11 and punch 12. In addition to sealing the contents of the operation of volume as indicated above, this gasket assembly 16, because of the particular properties of the materials chosen for making these gaskets, permits relatively large movement of the punch (or punches) with respect to belt 11, while experiencing and transmitting high pressures from the apparatus to the specimen in a generally hydrostatic manner; provides electrical insulation between belt 11 and punches 12 and 13, while reaction vessel 14 is subjected to electrical resistance heating in order to provide high temperatures as required therein, and thermally insulates belt 11 from the high temperatures within reaction vessel 14.

A variety of materials may be employed to make gaskets 20 and 21. Pyrophyllite, tac, catlinite or other thermally and electrically insulating materials are preferred for this usage, while gasket 22 may be made of mild steel. The metal gasket 22 is utilized to impart toughness and ductility to the cooperating gasket elements.

In the practice of this invention various reaction vessel configurations may be employed, as for example, the conventional pyrophyllite-enclosed sample holder, a sample holder employing a sodium chloride midsection (described in U.S. 3,030,662—Strong) or the sample holder composed substantially entirely of sodium chloride (FIG. 2). However, in each case, two thermocouples, such as platinum-platinum rhodium thermocouples 31 and 32 are located so that one thermocouple is near the center of the reaction cell 14 to measure the temperature of the hottest point in the cell and the other thermocouple forms part of the pressure monitoring unit 33 being embedded in the graphite heater 34 to accurately detect the temperature of germanium body 36. Thermocouple 31 has leads 37 of platinum and 38 of platinum-rhodium and thermocouple 32 has leads 39 of platinum and 41 of platinum-rhodium. Leads 37 and 38 are conducted out of reaction vessel 14 through boron nitride tubes 42 and 43 respectively and then through gasket assembly 16 to a device to enable readout of the temperature sensed by thermocouple 31. Tubes 42 and 43 electrically insulate leads 37, 38 from graphite heater tube 44. In the arrangement shown in FIG. 2 the temperature in the reaction sample 46 comprising a diamond seed, graphite and a quantity of an appropriate catalyst metal is sensed by thermocouple 31. Sample 46 is electrically isolated by the surrounding sodium chloride located within heater tube 44. Likewise within the heater tube 44 is located a quantity of silicon of very high purity in the form of disc 47, which material will function to compensate for pressure decay within cell 14 as the diamond-forming reaction progresses by being made to undergo a change of state phase transformation resulting in an increase in the volume thereof. Control over the phase transformation is maintained preferably by using a secondary heating circuit (which may or may not employ a part of the main heater) as the heating means. Two heating arrangements enabling independent control over the heating means in order to effect the phase transformation on demand are shown in FIGS. 11 and 12. The portion of the reaction cell configuration shown in FIG. 2 contributing to the main and secondary heating circuits are as follows: for the main heating circuit the electrically conductive elements in electrical contact with each other and with punches 12 and 13 are ring 48, disc 49, heater tube 44, disc 51 and ring 52; for the secondary heating circuit the electrically conductive elements in electrical contact with each other, with upper steel cone 22 and punch 12 are ring 53, ring 54, tab 57 on washer 58, washer 58, the upper portion of heater tube 44, disc 49 and ring 48. Preferably the non-conductive portions of reaction vessel 14, except for the non-conductive parts of end cap assemblies 59 and 61 which are formed from pyrophyllite are made of sodium chloride. However, other materials such as have been recited for the composition of gaskets 20 and 21 may be used.

The arrangement for containing the germanium bar, or body, 36 is particularly important. One configuration and the manner in which the elements comprising this particular arrangement relate to one another is best shown in FIGS. 3 and 4. Several distinct advantages have been found to inure to this particular combination of graphite and germanium. By employing graphite as the heating element 34 for the germanium 36 and by covering a substantial portion of the surface of the germanium bar 36 with graphite has proven to be substantially free from several disadvantages of the usual arrangements employed for detecting the melting point of a material to be used as a measure of pressure by the resistance-change method. This disadvantage is that ordinarily the melting point tends to be spread over a range of temperature over which the value of the resistance changes rapidly. Unfortunately, this behavior greatly reduces the accuracy of the melting point detection. On the contrary, by either fully containing the germanium body 36 in graphite or by covering a substantial portion of the surface thereof, it has been found that in the conduct of the resistance-change method the melting point of the germanium is very sharply discernible. This apparently follows because as long as the germanium remains solid the resistance of the graphite 34 remains the resistance of the combined structure 33 and the change in the resistance of the graphite very slowly decreases with increasing temperature. However, as soon as melting occurs in the germanium 36, the germanium 36 becomes conductive and the resistance of the combined structure 33 drops very sharply. Also, once melting of the germanium 36 has begun the combined graphite-germanium pressure monitoring unit 33 remains at constant temperature, the melting point of germanium, until a very large increase in power is supplied. Another prime advantage of the graphite-germanium combination is the fact that thermocouple 32 may be kept in an isothermal region with the germanium bar 36 by forming thermocouple 32 as a flattened bead on the thermocouple wire (i.e. 0.005 inch Pt/Pt 10 Rh wire) and pressing this bead 32 into the graphite strip heater 34 over the germanium (as shown in FIG. 4) so that the thermocouple 32 actually becomes a part of the heating circuit. The use of graphite makes this arrangement possible and enables the production of reading of superior accuracy. Further, graphite has practically a constant value for resistivity, which offers a distinct advantage over containment by a tube of titanium or of other materials; graphite is chemically inert and is able to function simultaneously both as the heating means and as the containment means for the germanium. Containment of the germanium is particularly important since contact between germanium 36, when molten, and the thermocouple 32 completely destroys the calibration of the thermocouple 32.

Germanium was selected as the material best suited to monitor pressure changes occurring within the reaction vessel 14 primarily because the fusion curve of germanium is linear up to the triple point. This curve is shown in FIG. 5 and the lack of curvature suggests that the compressibilities for solid and liquid germanium remain equal in the pressure range illustrated. As a means for pressure measurement at high temperatures, the melting point of germanium offers the convenience of its temperature range (930° to 580° C.), its large negative slope and its latent heat of melting.

As the result of many observations of pressure variations during the diamond growth process made with germanium, it was determined that at the initiation of diamond growth a rapid initial pressure decrease occurred in the reaction cell followed by a slow continuing pressure loss during the progress of diamond growth. Diamond growth is known to be very sensitive to the pressure-temperature-time relationship and this ability of germanium to provide accurate detection of pressure changes occurring during diamond growth is particularly important, if any control mechanism is to be successfully employed to optimize the graphite-diamond reaction by compensating for pressure relaxation.

In order to employ the germanium body 36 to monitor pressure changes during high pressure, high temperature operations it is necesary first to obtain pressure calibrations of the particular reaction cell configuration employed. FIG. 8 shows three pressure calibration curves (a, b and c) of which curves a and b represent the calibration curves for the reaction cell configuration shown in FIG. 2 with curve a being the calibration curve at room temperature and curve b being the calibration curve at diamond growth temperature (about 1400° C.). Curve c is the calibration curve at room temperature for a reaction cell employing a pyrophyllite outer cylinder in place of the sodium chloride of the reaction cell described in FIG. 2. Curves a and c were obtained from the usual room temperature pressure calibration reference points, i.e., 25 and 27 kilobars (kb.) for bismuth; 37 kb. for tantalum, and 59 kb. for barium. Curve b is obtained by introducing the graphite-germanium pressure monitoring unit 33 into the cell configuration. Thereafter, for various specific pressure applications the temperature of the graphite-germanium unit 33 alone is raised to melt the germanium 36. This germanium melting temperature is recorded. Then for the same pressure applications the melting point of the germanium 36 is found for the second time with the entire cell 14 heated to the operating temperature to be employed (i.e. about 1400° C. for diamon growth) and the change in melting point temperature is observed. Thereupon, by determining the rate of change of the melting point of germanium with pressure from FIG. 5 (slope of fusion curve), the pressure change in cell 14 actually due to heating of the cell is calculable. When a sufficient number of such corrected points have been established, curve b may be plotted.

Some indication of the advantage of using sodium chloride for reaction cell construction may be seen by comparing curves a and b. When salt is heated under pressure it expands and therefor contributes additional pressure to the system. Pyrophyllite (curve c), on the other hand, tends to become more dense under pressure when heated. Thus, the pressure in the salt cell was found to have increased from 12 to 17 percent above the room temperature calibration by heating to approximately 1400° C.

Once the pressure calibration curve for the particular reaction vessel configuration to be used has been established, the proper press load may be applied to provide the desired operating pressure in the reaction cell using the pressure calibration curve for the approximate operating temperature. Thereafter during conduct of the high pressure process the variations in internal cell pressure from the desired pressure valve may be determined readily with the pressure monitoring means; that is, pressure monitoring unit 33 and the accompanying circuitry and instrumentation shown in FIG. 10, since each temperature recorded for a given melting of germanium body 36 has a corresponding pressure value on FIG. 5. The pressure monitoring unit 33 is periodically heated to find the melting point of the germanium bar 36, the melting point being discerned by observing a sharp change in current in voltage in the indicating circuit signifying a marked change in resistance.

In FIG. 10 there is shown the manner in which the thermocouple leads 39 and 41 and electrical lead 66 for heater 34 proceed from the interior of cell 14. In order to read out temperature in absolute values with thermocouple 32 (a similar arrangement though not shown is used for thermocouple 31), recording potentiometer 67 is connected to thermocouple 32 via leads 39 and 41 through an ice junction 68. The electrical circuitry for heating the unit 33 may be effected in various ways, however, in FIG. 10, lead 66 from heater 34 is brought into contact with belt 11. Belt 11 in turn is electrically connected to transformer 69. Lead 71 from heater 34 is conducted down through the sodium chloride cell construction into electrical contact with disc 51. Electrical contact is then effected to the other terminal of transformer 69 via ring 52 and punch 13. The electrical power input to heater 34 is controlled by conventional means 72, such as an autotransformer.

In choosing the particular configuration to be used in combining graphite and germanium to construct the pressure monitoring unit 33, it is essential that the germanium be maintained separated from the thermocouple 32, and preferable that thermocouple 32 be embedded in graphite heater 34. Therefore, the graphite heater 34 must, at least in the region thereof receiving germanium body 36, have an area at least as large as that area of the body 36 with which it is in contact to completely isolate the thermocouple from the germanium and thick enough to comfortably receive the embedded thermocouple 32. A second criterion should be that the graphite should be so disposed around the germanium as to maintain symmetry; that is, as shown in FIG. 4 the same amount of graphite is located below germanium body 33 as is located above this body. In addition, it is desirable that in any cross-section taken through the graphite-germanium unit 33 across the unit viewed as shown in FIG. 3 in the portion thereof where germanium body 36 is located over 50% of the composite cross-sectional area should be germanium metal. The same criteria apply as well when the piece of germanium is enclosed entirely in graphite. It is preferable to locate the pressure monitoring unit 33 in the central two-thirds of the height of sample holder 14 thereby placing unit 33 in a position where the temperature of the germanium will be about 100° C. or less below the temperature of the center of the sample holder 14 when heated.

Although germanium is preferred as the detecting material in pressure monitoring unit 33, this preference is due to the linear nature of the fusion curve of germanium. Conceivably other suitable materials may be found, which exhibit similar fusion properties. Regardless of the particular material employed for the indicating function it is important that the pressure monitoring unit, per se, be located at the proper position in the reaction cell 14 relative to the center of the cell, which is the hottest part thereof. Knowing the approximate temperature gradient within the reaction cell enables location of the pressure monitoring unit at a position within the cell having a temperature, which will be near but a little below the melting temperature of the detecting material employed at the appropriate operating pressure and temperature.

At least one previous attempt to compensate for the decrease in pressure occurring during high pressure, high temperature reactions, such as during the graphite-diamond reaction for example, has employed the approach (U.S. 3,147,433) of seeking to compensate for pressure decay by increasing the press load. Using this type of control it has proved surprisingly difficult to restore pressure in the reaction cell by this method in any smooth, closely-controlled manner. The pressure increases effected in reaction cell 14 were erratic and the application thereof was very difficult to control. This was probably due to the high friction in the gasketing material 16 and, as is shown in FIG. 9, when the reaction cell is in the heated condition, a much greater increase in press load is required to effect a given change in pressure within the reaction cell than would be the case, if the reaction cell were at room temperature. Thus, curve $k$ represents the pressure gradient that can be expected in a reaction cell at room temperature. This curve $k$ has a much steeper slope than curve $m$ which represents the pressure gradient that can be expected with the reaction cell already hot when the pressure is applied. For this reason apparatus 10 is normally brought up to the proper elevated pressure before the cell 14 is heated to proceed with the reaction. Because of the inordinately large application of additional press load required to effect an increase in internal cell pressure the danger of damage to the apparatus is greatly increased and such a mode of pressure compensation most often results in breakage of punches or dies, which are very expensive to replace. This disadvantage in addition to the fact that the behavior of the internal cell pressure is not subject to positive control have been reasons for continued research.

Therefore, the novel method of compensating for internal cell pressure decay forming a part of this invention is particularly advantageous because of the controllability offered to the operator. Also, the operator has available a choice of several materials, for example, those listed in Table I below, which will enable volume expansions of different amounts in order to provide various degrees of pressure compensation.

Most important, the operator by employing the afore-described pressure monitoring unit 33 can bring about the necessary extent of pressure compensation internally of cell 14 at the specific time that the pressure increase is required as indicated by the pressure monitoring unit 33.

The manner of compensating for pressure decay by this invention is to include within cell 14, for example, a quantity of one of the materials listed in Table I locating the selected material within reaction cell 14, as described below. When it is required, this material is caused to controllably experience a change of state phase transformation, which phase transformation is accomplished by a predictable increase in the volume of that material. This increase in volume within cell 14 must, of necessity, increase the internal cell pressure an amount dependent upon the extent of the change in volume.

TABLE I

| Substance | Phase Transformation | Temp., °C., at 50 kb. | $\Delta V./v._0$, percent |
|---|---|---|---|
| Silicon | Freezing | ~1,150 | 10 |
| Germanium | ----do---- | ~700 | ~10 |
| NaCl | Melting | ~1,200 | 10-15 |

After determining the nature of the temperature gradient within cell 14 under the operating conditions of temperature and pressure and the proper substance for pressure compensation has been chosen, i.e. from among those materials listed in Table I, this substance is to be located within reaction cell 14 at some point where the natural (previously known) temperature gradient within the cell will fix the temperature of the pressure compensating substance at a value close to its phase transformation temperature. Thereafter, when the phase transformation with its attendant increase in volume is required, the temperature of the pressure compensating substance may be raised or lowered to cause the proper change of state broadly referred to as a "solid-liquid" phase transformation. Considering specific substances; germanium, if used, should be located in a region further from the center of the cell than silicon would be located, because of the difference in the melting points of these two substances. Appropriate locations for germanium pressure compensating bodies are shown in FIGS. 6 and 7.

The amounts of the substances to be transformed to compensate for a pressure decrease from whatever cause of 1 kb. are tabulated below. The calculated quantities listed apply for a sample holder of ¾" diameter by .930" long. In a sample holder of this size, the growth of 60 mgm. of diamond, or a little over ¼ carat, will cause a pressure decrease of ~1 kb.

TABLE II

| Substance: | Weight required to compensate ΔP of −1 kb., gms. |
|---|---|
| Silicon | 0.56 |
| Germanium | 1.12 |
| NaCl | ~0.5 |

Several variations have been disclosed herein with respect to placement of the pressure compensating material, such as silicon disc 47 (FIG. 2) and with respect to the manner in which the temperature thereof may be controlled to effect the phase transformation on demand. Since silicon expands upon freezing, disc 47 of silicon is located within the main heater tube 44 near the center of the cell 14 at a point where the natural temperature of the cell gradient determines the temperature fo the silicon to be close to its freezing point at the temperature conditions required in charge 46 to produce diamond growth. In order to keep the temperature of the piece of silicon 47 above freezing an auxiliary heating current is passed through that end of the heater tube enclosing the quantity of silicon. The circuitry by which such heating is accomplished is shown schematically in FIG. 11 wherein disc 47 is located in the upper portion of heater tube 44. Thus, in addition to the main heater circuit by which power is supplied from transformer 76 via punches 12 and 13 to main heater tube 44, a secondary heater circuit is provided. Power for this auxiliary circuit is supplied from transformer 77 to the upper portion of the main heater tube 44 through a circuit, which consists of piston 12, ring 48, disc 49, the upper portion of main heater tube 44, washer 58, upturned tab 57, reaction cell ring 54, electrical contact end ring 53 and steel cone 22. Control for transformers 76 and 77 is provided by autotransformers 78 and 79 respectively.

When the operator desires to expand the silicon by freezing, the time for such expansion having been indicated by the pressure monitoring unit 33, it is necessary for the operator simply to reduce the auxiliary heating current sufficiently to enable the cooling and consequent freezing of the silicon. In addition, FIG. 11 includes the circuitry for heating the pressure monitoring unit 33 shown and describes in connection with FIG. 10.

As another example, in place of silicon, sodium chloride may be employed to provide the desired volume increase in which case the compensating temperature adjustment would be such as to foster melting of the sodium chloride. An arrangement whereby such melting could be controllably effected is shown in FIG. 12. The main heating circuit is supplied with power from transformer 81 and the secondary heating circuit is supplied with power from transformer 82. In each instance the amount of power employed is controlled by conventional means (83, 84) such as an autotransformer. In the arrangement shown in FIG. 12 for a graphite-diamond reaction, part of the main heating circuit is incorporated in the secondary circuit, which receives power from transformer 82. The secondary heating circuit elements connected to transformer 82 comprises upper piston 12, ring 48, disc 49, resistance heater 86 (a graphite rod or Nichrome wire), the conducting charge 46, lead wire 88 (which passes from the charge 46 to the exterior of cell 14 and contacts ring 55), ring 55, ring 60 and lower steel cone 22. In the device shown in FIG. 12, by passing current through the secondary heating circuit the sodium chloride in the upper portion of the reaction cell within main heater tube 44 is heated to the extent desired, causing the appropriate extent of melting of the salt and controllably bringing about consequent pressure increase therein to compensate for the pressure decay detected by the pressure monitoring unit 33.

Various other arrnagements may be employed in the event a phase change pressure compensating material having a lower melting point than silicon or sodium chloride is employed. Thus, in the case of germanium, such a material must be situated outside the main heater tube 44 during a high pressure operation employing relatively high temperatures such as in the case of diamond growth. In the reaction cell structure shown in FIG. 6 arranged for a graphite-diamond reaction, wherein germanium is employed for pressure compensation, a ring 91 of germanium is employed and reliance is placed upon proper location of ring 91 in the sodium chloride cylinder 92 separated from, but girding the charge 46, and also in the natural cell temperature gradient to insure that the germanium will be molten, when the reaction cell 14 is brought to the starting temperature for diamond growth. Later, when the pressure monitoring unit 33 indicates that the pressure has begun to decrease due to the formation of diamond, the main heating power is reduced to a lower temperature (still within the region for diamond growth) until a sufficient quantity of the germanium is caused to freeze and expand with the establishment of a new temperature gradient within the cell 14. This expansion of the germanium ring 91 restores the pressure within cell 14 to its initial level. Since in the cell construction shown in FIG. 6 sodium chloride is employed within the main heater tube 44 and a decrease in the cell temperature will cause freezing of some of the salt in the hottest part of the cell, which would otherwise be molten, thereby causing a small volume reduction, it is necessary to freeze a large enough quantity of germanium in ring 91 to compensate both for the decrease in volume due to diamond growth and that due to the freezing of sodium chloride.

A more controllable arrangement is disclosed in FIG. 7 wherein the germanium ring 93 is employed with an auxiliary heating unit 94 adjacent thereto by which the temperature of the germanium ring 93 may be varied by as much as 100° C. The main heater tube 44 is kept at a constant temperature and with the germanium ring 93 properly located in the thermal gradient its temperature will be maintained near but slightly above its melting point. Leads to and from heater 94 would be connected to a secondary heating circuit such as is disclosed in FIG. 10 for the heating of pressure monitoring means 33.

By employing the invention disclosed herein in the conduct of superpressure apparatus operations the technician will be provided with a degree of control over the pressure conditions within the reaction cell which was hitherto unavailable. This high degree of control and reliability is available only as the result of this novel operative combination of a sensitive accurate pressure monitoring means using therein an electrically conducting material having a substantially linear fusion curve and pressure compensating means employing a controllable change of state volume change.

What I claim as new and desire to secure by Letters Patent of the United States is:

1. In a reaction vessel constructed of pressure transmitting material in combination with main heating means for the respective purposes of simultaneously transmitting high pressure to a quantity of reaction material to be contained therein and raising the temperature thereof whereby a physical or chemical change may be effected therein, an improved pressure monitoring device comprising in combination:

(a) a piece of germanium disposed within the reaction vessel, (b) a body of graphite symmetrically enclosing said piece of germanium at least in part, (c) means for sensing the temperature of the graphite enclosed germanium, (d) means electrically connected to said body of graphite to controllably supply electric current thereto and (e) means included in said current supply means for measuring the voltage and current parameters occurring therein.

2. The improvement substantially as recited in claim 1 wherein in any transverse section of the pressure monitoring unit cutting through the portion of said monitoring unit containing germanium, the germanium occupies at least 50% of the transverse cross-sectional area of said monitoring unit.

3. The improvement substantially as recited in claim 1 wherein the means for sensing the temperature of the graphite-enclosed germanium is a thermocouple recessed into the graphite body.

4. In the process of preparing a pressure absorbing, thermally insulating structure for enclosing a quantity of a first material therein to enable simultaneous application thereto of high pressure and heat, whereby after said pressure absorbing structure is introduced into the reaction volume of a high pressure, high temperature apparatus, some physical and/or chemical change is effected in such material, which change is usually accompanied by an increase in density, the improvement comprising:

(a) confining a quantity of a second material within said pressure absorbing structure in addition to the reaction material,
  (1) said second material being expandable to at least about 105 percent of the initial volume thereof at operating pressure at some predetermined elevated temperature by subjecting said second material to a solid-liquid phase transformation, and said second material being present in sufficient quantity to exert a pressure of at least about one kilobar upon the occurence of such phase transformation, (b) heating said pressure absorbing structure by means of the main heating means, whereby said second material is heated to a temperature approximating, but not equalling said predetermined temperature, and (c) independently and selectively applying heat to said second material from auxiliary heating means in addition to the heat energy supplied by said main heating means to control the relative temperature of said second material, whereby phase transformation of said first material at said predetermined temperature can be effected on demand during operation.

5. The improvement substantially as recited in claim 4 wherein the quantity of second material is located spaced from and girding the quantity of first material.

6. The improvement substantially as recited in claim 4 wherein the quantity of second material is located at a position in the pressure absorbing structure at which the temperature of the second material at operating temperatures and pressures independent of heat energy input from the auxiliary heating means is within about 100° C. of the phase transformation temperature thereof.

7. The improvement substantially as recited in claim 4 wherein the pressure in the vicinity of the first material is monitored in order to facilitate timely initiation of the phase transformation.

8. The improvement substantially as recited in claim 4 wherein the pressure absorbing structure is a reaction vessel.

References Cited by the Examiner
UNITED STATES PATENTS

| | | |
|---|---|---|
| 2,941,245 | 6/1960 | Cheney. |
| 2,990,583 | 7/1961 | Barbera. |
| 3,067,465 | 12/1962 | Gradini et al. |
| 3,172,988 | 3/1965 | Zeittin. |

WILLIAM J. STEPHENSON, *Primary Examiner.*